UNITED STATES PATENT OFFICE.

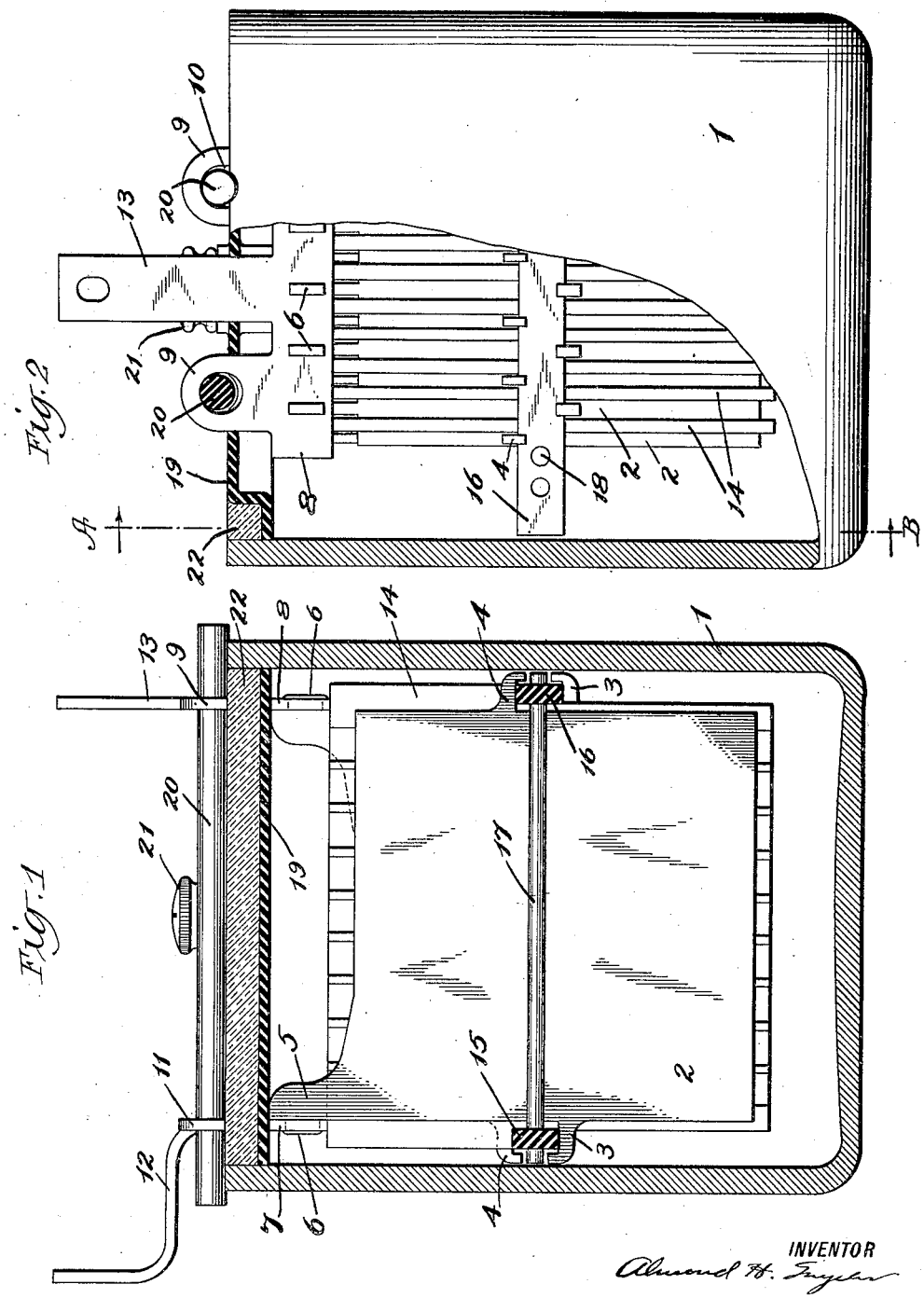

ALMOND H. SNYDER, OF LANCASTER, NEW YORK, ASSIGNOR TO GOULD STORAGE BATTERY COMPANY, A CORPORATION OF NEW YORK.

BATTERY.

1,363,683.      Specification of Letters Patent.      Patented Dec. 28, 1920.

Application filed February 28, 1918. Serial No. 219,694.

*To all whom it may concern:*

Be it known that I, ALMOND H. SNYDER, a citizen of the United States, residing in Lancaster, county of Erie, and State of New York, have invented new and useful Improvements in Batteries, set forth in the annexed specification and drawing, forming a part thereof.

My invention pertains to that type of batteries which employ a plurality of plates in close proximity to each other and wherein the plates of one polarity are insulated from the other.

My invention provides means whereby the plates may be securely held in proper relative positions with respect to each other and properly insulated from each other. My invention also provides an effective and inexpensive means for supporting a plurality of plates in a jar containing electrolyte in such manner that contact with any sediment in the bottom of the jar will be avoided.

Figure 1 is a partial section and partial side elevation of a battery comprehending my invention. Fig. 2 is an end elevation and partial section of the battery shown in Fig. 1. The section shown in Fig. 1 is taken on the line A—B of Fig. 2; and Fig. 1 shows in side elevation the elements of the battery shown in end elevation in Fig. 2.

In the figures, 1 represents any suitable jar or receptacle for containing the battery elements and the electrolyte. The plates 2, regardless of polarity, may all have the same external configuration, which preferably comprehends lugs 3 at one edge of the plates and similar, though inverted, lugs 4 at the opposite edge of the plates, which lugs are spaced at different distances with respect to center lines of the plates, for a purpose which will hereinafter be set forth.

On the side of the plates provided with the lower positioned lugs 3, I provide upwardly extending ears 5 which are preferably provided with laterally extending lugs 6.

In practice, it is customary, especially in lead storage batteries, to which my invention is particularly applicable, to use an odd number of negative plates greater by one than the number of positive plates, as is well understood in the art, for the purpose of providing a negative plate at each end of an assembled group. The end plate shown in side elevation at 2 in Fig. 1 may be considered as the negative end plate which appears in end elevation in Fig. 2 as the first plate 2 from the left, while the next plate 2 is a positive plate, and so on, as will be more fully explained. A suitable number of negative plates are united to a conducting member 7, shown in Fig. 1, by passing the lugs 6 therethrough and lead-burning the same to the said member which is similar to the member 8 in Fig. 2, which carries an even number of positive plates having their upwardly extending ears 5 united to the said member 8 as by lead-burning the members 6 therein, as indicated in the said Fig. 2. The positive connecting member 8 is provided with upwardly extending ears 9, perforated as indicated at 10; while the negative connecting member 7 is provided with similar upwardly extending ears, one of which is shown at 11, and both of which are perforated in the same manner as the ears 9. The connecting members 7 and 8 are provided with any suitable lugs or extensions, as indicated at 12 and 13, respectively, for the purpose of connecting the plates in an external circuit.

To assemble the battery, I take a suitable group of negative plates, joined as above described, and a suitable group of positive plates, assembled as above outlined, and nest them with a positive between each pair of negatives, in such manner that the connecting piece 7 attached to the lugs 5 of the negative plates is at one side of the assemblage, and the connecting member 8 carrying the positive plates at the other side of the assemblage. I then place suitable separators, as indicated at 14, which may be of any suitable material and type between the plates, in the usual manner. Such assembling of the plates will place all of the lower lugs 3 of the negative plates on one side of the group, and all of the upper inverted lugs 4 of the positive plates on this side, while the opposite side will contain all the upper lugs 4 of the negative plates and the lower lugs 3 of the positive plates. Between the lower lugs of the negative plates and the upper lugs of the positive plates on one side, I insert the insulating member or rod 15; while in like manner, on the opposite side, I insert the insulating member 16. The separators 14 are preferably so shaped that they will rest upon the members 15 and 16 and be held in proper position between the plates. I now pass a rod of suitable acid resisting material 17 through the holes 18 in the members 15 and 16 on each side of the assembled plates, and these rods hold the plates snugly together. The members 15 and 16 are preferably of sufficient length to almost touch the sides of the jar or receptacle 1, and therefore prevent the plates from shifting or swaying when the battery is vibrated. And I preferably provide a plurality of holes in the members 15 and 16, as indicated, so that rods 17 may be placed in different positions to correspond with the number of plates used in a cell. With the plates thus assembled, they may be lifted as a unit by the ears 9 and 11, and when so lifted or suspended they will be securely locked together by the engagement of the ears 3 and 4 with the members 15 and 16. 19 is a suitable cover fitting closely into the jar 1 and provided with suitable apertures through which the suspension ears 9 and 11 and also the connecting lugs 12 and 13 may pass. Insulating rods 20 are passed through the apertures 10 in the lugs 9 and 11 and serve to hold the cover in proper relation to the elements. The rods 20 are of suitable length that when the elements are placed in the jar or receptacle, as indicated in the figures, they will rest upon the sides of the jar and cause the elements to be supported by the jar. The cover 19 is preferably provided with a filling and vent cap arrangement 21, as ordinarily used with sealed batteries, and the cover is preferably flanged, as indicated in Fig. 2, in such manner as to provide a recess or groove for cement, as indicated at 22, by means of which the jar can be hermetically sealed.

From the foregoing it will be noted that I have provided a very simple and effective means for holding the plates in their proper relationship to each other and insulating the plates of one polarity from those of the opposite polarity. Also, that I have provided a very simple and effective means for carrying all of the plates when assembled in the electrolyte whereby the plates are held clear from the bottom of the jar or receptacle which they occupy, and therefore are not liable to come into contact with any sediment or foreign substance that may accumulate in any reasonable quantity in the bottom of the jar.

I do not wish in any way to limit myself to any of the exact details of construction or employment of my invention set forth above to illustrate a use of the same, as many departures may be made without departing from the spirit and scope of my invention which is as set forth in the following claims.

I claim—

1. The combination with a plurality of electrodes of like polarity and a plurality of electrodes of an opposite polarity, some electrodes of each polarity being provided at a plurality of their edges with engaging means, of insulating means carried in juxtaposition to the edges of the electrodes by engagement on each side of the electrodes with a plurality of the engaging means of opposite polarities and holding the plates of both polarities in proper relative position with respect to each other.

2. The combination with a polarity of positive plates and a plurality of negative plates each provided with engaging means, of insulating means carried by the engaging means of each polarity and supporting an engaging means of the opposite polarity, and separating means carried between the plates by the insulating means.

3. The combination with a plurality of electrodes of like polarity and a plurality of electrodes of opposite polarity each provided at a plurality of their edges with engaging means, insulating means carried in juxtaposition to said edges by engagement on each side with a plurality of the engaging means of both polarities, and separating means between the plates carried by said insulating means.

4. The combination with a plurality of plates of different polarity, each provided with similar engaging means, insulating means carried by the engaging means of each polarity and supporting the engaging means of the opposite polarity, and suspension means engaging all of the plates of each polarity.

5. The combination with a plurality of plates of different polarity, each provided with similar engaging means, insulating means carried by the engaging means of one polarity and supporting the engaging means of another polarity, suspension means engaging all of the plates of each polarity, and means for supporting said suspension means.

6. The combination with a plurality of plates of a plurality of polarities each provided with similar engaging means, insulating means carried by the engaging means of each polarity at a plurality of sides of the plates and supporting an engaging means of the plates of the opposite polarity, suspension means carrying the plates of each polarity, insulating means for supporting said suspension means and insulating one polarity from the other, a receptacle for containing the plates, an electrolyte contained therein, said receptacle supporting all of the plates by supporting the suspension means.

ALMOND H. SNYDER.